US012049783B1

(12) United States Patent
Otterlee

(10) Patent No.: US 12,049,783 B1
(45) Date of Patent: Jul. 30, 2024

(54) SECURITY CAGE

(71) Applicant: Timothy A. Otterlee, Kennesaw, GA (US)

(72) Inventor: Timothy A. Otterlee, Kennesaw, GA (US)

( * ) Notice: Subject to any disclaimer, the term of this patent is extended or adjusted under 35 U.S.C. 154(b) by 707 days.

(21) Appl. No.: 17/186,585

(22) Filed: Feb. 26, 2021

Related U.S. Application Data

(60) Provisional application No. 62/982,428, filed on Feb. 27, 2020.

(51) Int. Cl.

*E05G 1/024* (2006.01)
*E05C 9/02* (2006.01)
*E05B 47/00* (2006.01)
*E05B 65/00* (2006.01)

(52) U.S. Cl.

CPC .......... *E05G 1/024* (2013.01); *E05B 47/0001* (2013.01); *E05B 65/0075* (2013.01); *E05C 9/02* (2013.01)

(58) Field of Classification Search

CPC .. E05G 1/02; E05G 1/024; E05G 1/06; E05G 1/08; E05B 65/0075; E05C 9/02

See application file for complete search history.

(56) References Cited

U.S. PATENT DOCUMENTS 4,566,237 A * 1/1986 Turner ...................... E04H 9/10 428/116
7,761,963 B2 * 7/2010 Koch ................ B65D 11/1873 27/35
8,316,780 B2 * 11/2012 Ng ......................... B65D 19/18 108/56.1
9,752,372 B2 * 9/2017 Arendsee .................. E05G 1/04
10,174,956 B2 * 1/2019 Stanton ................. E05B 67/383
2006/0180059 A1 * 8/2006 Martin .................. E04H 1/1238 109/79
2010/0018966 A1 * 1/2010 Roberts, Sr. ........... B65D 19/18 220/4.31
2011/0309072 A1 * 12/2011 Rio Gonzalez .... B65D 11/1873 219/121.68
2014/0007629 A1 * 1/2014 Arendsee .................. E05G 1/04 70/58
2020/0123839 A1 * 4/2020 Sääf ........................ E05G 1/024

* cited by examiner

*Primary Examiner* — Christopher J Boswell

(57) ABSTRACT

A security cage includes a first side panel having a first vertical edge that defines a height, a first locking tab extending from the first vertical edge and defining a first upward facing hook, a second side panel having a second vertical edge, a second locking tab extending from the second vertical edge and defining a second upward facing hook. The second side panel is positioned adjacent to and parallel to the first side panel such that the first locking tab is positioned adjacent the second locking tab. A side locking member has a first downward facing hook and a second downward facing hook, the first downward facing hook engaging the first upward facing hook and the second downward facing hook engaging the second upward facing hook to fix the second side panel with respect to the first side panel.

19 Claims, 16 Drawing Sheets

SECURITY CAGE

BACKGROUND

Consumer electronics and other expensive retail items are desirable targets for theft due to their value and their continuing trend toward smaller sizes. It can be difficult for retailers and other sellers to safely store these devices. In addition, other items, such as medications or drugs may also be difficult to store on some premises.

SUMMARY

In one aspect, a security cage includes a first side panel having a first vertical edge that defines a height, a first locking tab extending from the first vertical edge and defining a first upward facing hook, a second side panel having a second vertical edge, a second locking tab extending from the second vertical edge and defining a second upward facing hook. The second side panel is positioned adjacent to and parallel to the first side panel such that the first locking tab is positioned adjacent the second locking tab. A side locking member has a first downward facing hook and a second downward facing hook, the first downward facing hook engaging the first upward facing hook and the second downward facing hook engaging the second upward facing hook to fix the second side panel with respect to the first side panel.

In another aspect, a security cage includes a first side panel, a second side panel, a side locking member coupled to the first side panel and the second side panel to connect the first side panel to the second side panel. A first roof panel is connected to the first side panel and has a first edge that defines a first roof connection portion. A second roof panel is connected to the second side panel and has a second edge that defines a second roof connection portion. The second roof connection portion is positioned adjacent the first roof connection portion, a roof lock is connected to each of the first roof connection portion and the second roof connection portion, and a roof lock cover is coupled to the roof lock to cover the roof lock.

In yet another aspect, a security cage includes a first side panel having a planar portion, a first edge arranged at a first oblique angle with respect to the planar portion and a second edge arranged at second oblique angle with respect to the planar portion. A second side panel has a planar portion, a third edge arranged at a third oblique angle with respect to the planar portion and a fourth edge arranged at a fourth oblique angle with respect to the planar portion. The second side panel is positioned adjacent the first side panel such that the first edge and the third edge cooperate to define a 90-degree angle therebetween. A third side panel has a planar portion, a fifth edge arranged at a fifth oblique angle with respect to the planar portion and a sixth edge arranged at a sixth oblique angle with respect to the planar portion. The third side panel is positioned adjacent the second side panel such that the fifth edge and the fourth edge are parallel to one another. A first roof panel is connected to the first side panel, the first roof panel having a first edge that defines a first roof connection portion. A second roof panel is connected to the second side panel, the second roof panel having a second edge that defines a second roof connection portion. The second roof connection portion is positioned adjacent the first roof connection portion, and a roof lock is connected to each of the first roof connection portion and the second roof connection portion.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

It should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise.

Figure 1:
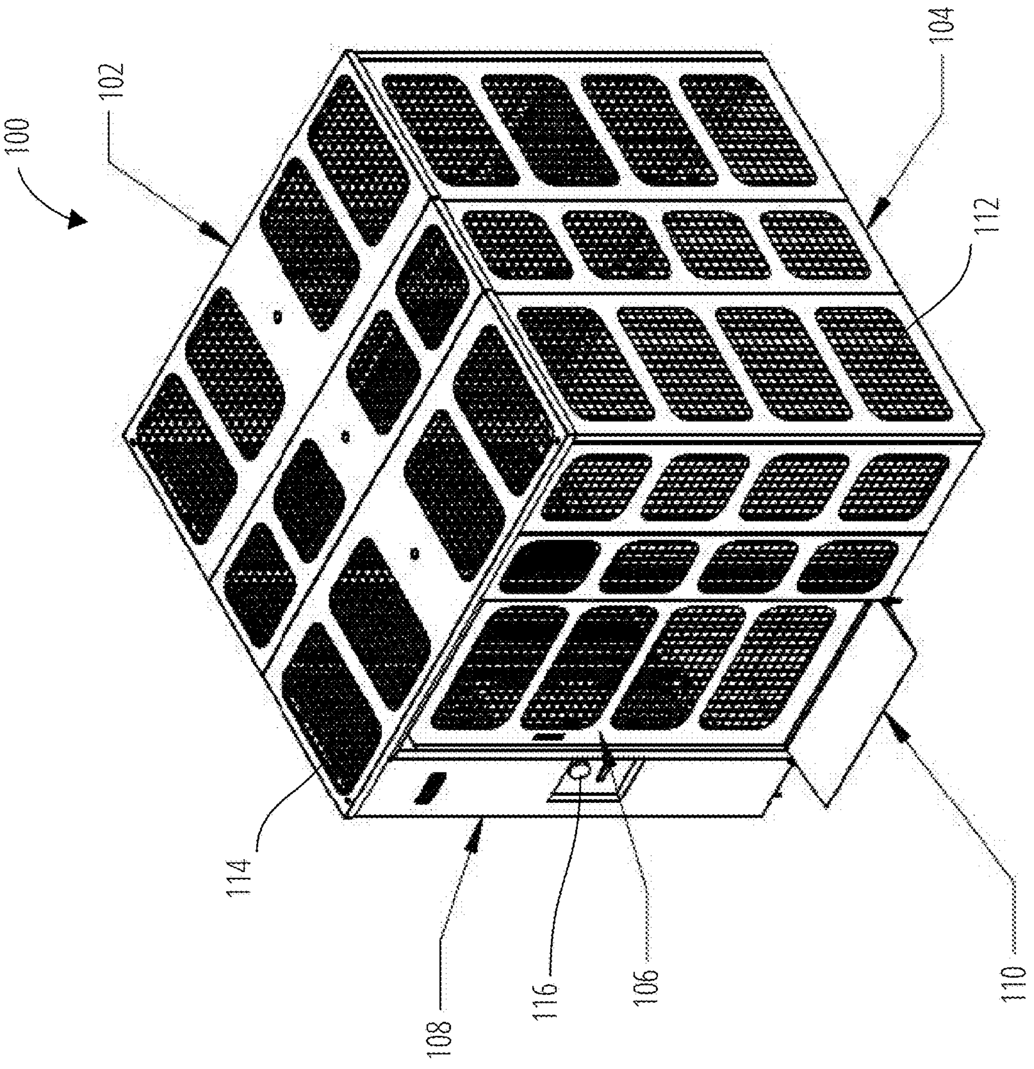
FIG. 1 illustrates a cage for the containment of components.

As illustrated in FIG. 1 a cage 100 suitable for use in storing things such as consumer electronics, controlled substances, and the like includes a ceiling 102 (sometimes referred to as a roof panel), at least one sidewall 104, a door 106, and an entry panel 108. In the illustrated construction, the cage 100 is cube-shaped such that the sidewall 104 is one of four sidewalls that in turn support the ceiling 102. Of course, other shapes or arrangements could be used if desired such that more or fewer sidewalls are employed.

One of the sidewalls includes the door 106 and the entry panel 108 that allow for entry and egress from the cage 100. The entry panel 108 includes any entry control device 116 such as a card reader, a keypad, or any other entry control mechanism. In the illustrated construction, the door 106 is a sliding door 106. However, other constructions could include a swinging door or another door arrangement as desired.

The illustrated construction includes a floor 112 that is coupled to each sidewall 104 such that the space within the cage 100 is fully surrounded. However, some constructions could omit the floor 112 and simply attach each sidewall to the floor 112.

Each sidewall 104, the door 106. and the ceiling 102 include at least one mesh area 114 that allows for visibility through the sidewall 104, the door 106, or the ceiling 102. In the illustrated construction, each mesh area 114 includes cross-connected metal members such as chain links with other arrangements also being possible. In still other constructions, transparent or translucent materials can be employed to provide the desired visibility into the cage 100.

A ramp 110 is provided at the entrance to allow for easy ingress and egress as well as to allow for wheelchair access into and out of the cage 100.

Figure 2:
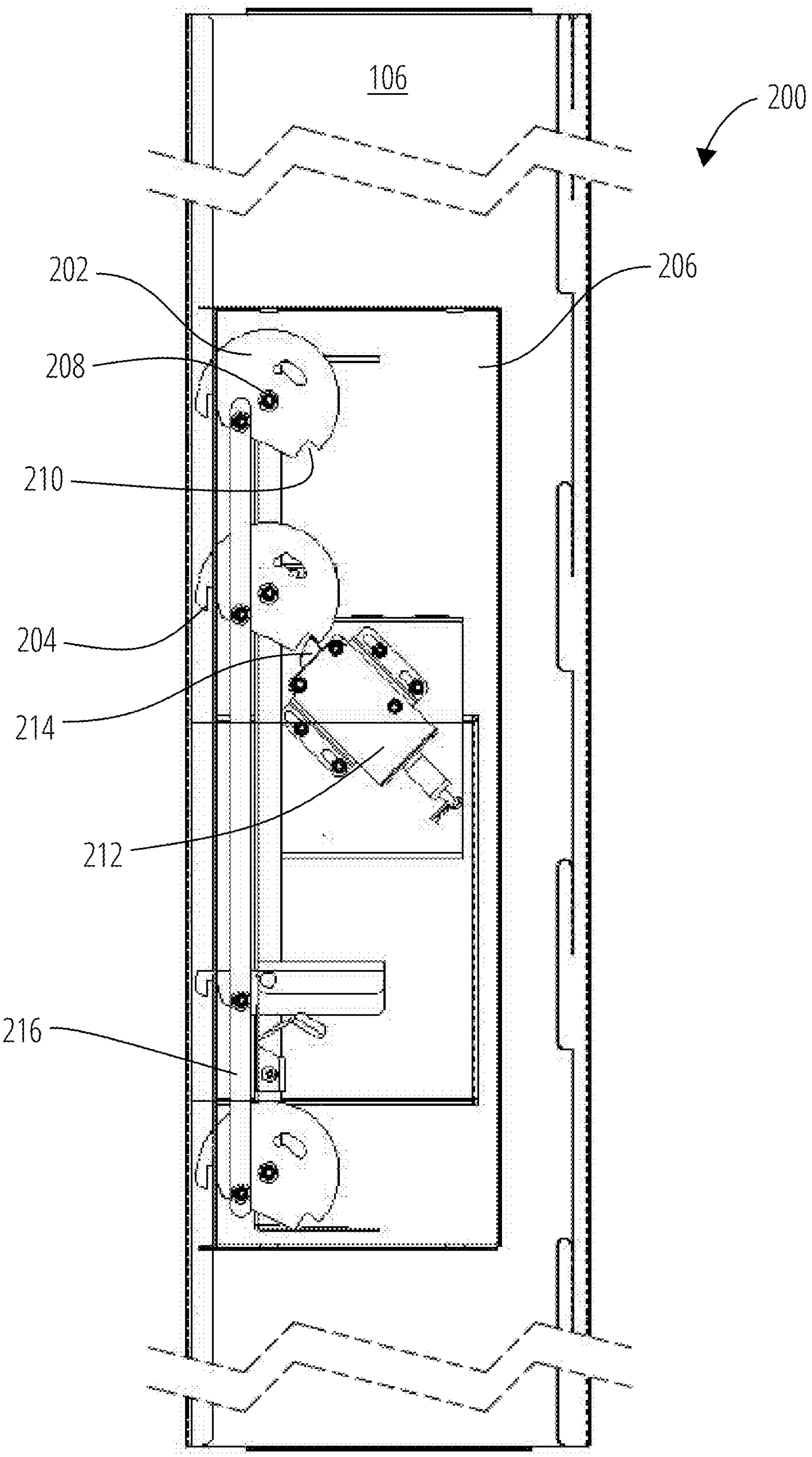
FIG. 2 illustrates a latch mechanism for use with a door of the cage of FIG. 1.

FIG. 2 illustrates a portion of a latch mechanism 200 suitable for use with a door 106 that includes a door latch that holds the door in the closed position. A mount plate 206 is supported in a position adjacent an edge of the door 106 and supports one or more latch members 202 that pivot about one or more pivot pins 208 to move the latch members 202 into and out of engagement to allow the door 106 to open and close.

In the illustrated construction of FIG. 2, the latch mechanism 200 includes four latch members 202 (one hidden) that each include a pawl 204 and a lock hook 210. Of course, any number of latch members 202 greater than or equal to one could be employed as desired. Each pawl 204 is arranged to fit within a slot formed in the adjacent wall and is rotatable between an unlocked position in which it can move into or out of the slot and a locked position in which the pawl 204 hooks the adjacent wall to inhibit unwanted removal of the latch member 202 from the adjacent wall.

Each of the latch members 202 is attached for rotation to the other latch members 202 so that they all rotate in unison. In the illustrated construction, a rigid bar 216 interconnects the various latch members 202. in other constructions, other construction mechanisms such as a rack and pinion arrangement, a gear arrangement, magnetic coupling, etc. Could be employed.

A lock assembly 212 is positioned adjacent one or more of the latch members 202 and is operable to selectively lock the latch members 202 in their engaged or locked position. Each lock assembly 212 includes a lock member 214 that is selectively movable into and out of engagement with the lock hook 210 of one or more of the latch members 202. In the engaged position, illustrated in FIG. 2, a flat side of the lock member 214 engages the lock hook 210 and inhibits rotation of the latch members 202 from the engaged to the disengaged positions.

The lock member 214 also includes a rounded surface that allows the lock member 214 to ride on the surface of the latch member 202 when the latch member 202 is rotated from the disengaged position toward the engaged position. However, once the latch member 202 reaches the engaged position, the lock member 214 engages with the lock hook 210 and the latch members 202 are held in the locked position.

The lock assembly 212 can be mechanically actuated and locked much like known door lock assemblies. In other constructions, a pneumatic, electrical, magnetic, or otherwise actuated lock assembly 212 is employed.

Figure 3:
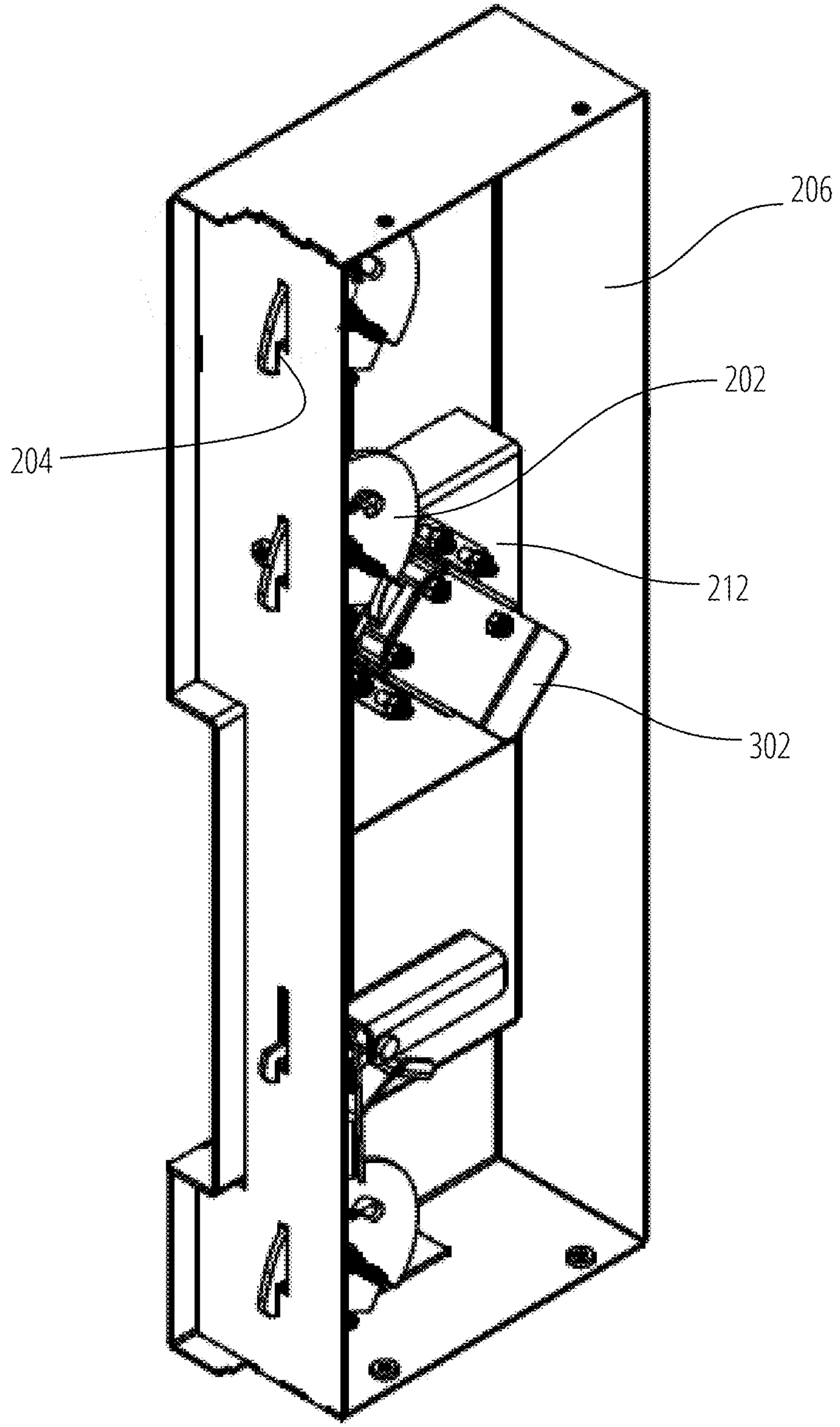
FIG. 3 is a perspective view of the latch mechanism of FIG. 2.

FIG. 3 illustrates the mount plate 206 and the components supported by the mount plate 206 before the mount plate 206 is attached to the door 106. In this view, the four pawls 204 can be seen protruding through a wall of the mount plate 206 and in an engaged or locked position. A handle attachment 302 extends from the lock assembly 212 and provides an attachment point for a handle that could be rotated by a user to engage or disengage the lock assembly 212 to open or close the door 106.

Corner brackets can be arranged to allow for lift and drop attachment of one sidewall 104 to another sidewall 104 or another element. The corner brackets may include a mounting portion and a hook arranged at an angle with respect to one another. The angle is determined based on the shape of the cage 100. In the illustrated example, the cage 100 is cube-shaped such that the angle is ninety degrees.

The mounting portions include several mounting holes that are arranged to facilitate the firm and fixed attachment of the corner brackets to the sidewall 104. In preferred constructions, the sidewall 104 includes more than one corner bracket to facilitate a firm attachment between the sidewall 104 and the component to which it attaches. The hook is arranged to fit in a slot or to otherwise hook a portion of the component to which the sidewall 104 attaches to facilitate a lift and drop attachment.

To complete a corner attachment, the corner brackets of one sidewall 104 attach to second corner brackets of the second sidewall 104 to interlock the two components (e.g., one sidewall 104 attaching to another sidewall 104). The second corner bracket is a mirror image of the first corner bracket such that they can engage one another. The second corner bracket would attach to the sidewall 104 in much the same way as the corner bracket. In addition, more than one second corner bracket would be positioned on the edge of the sidewall 104 to facilitate the attachment desired.

Figure 4:
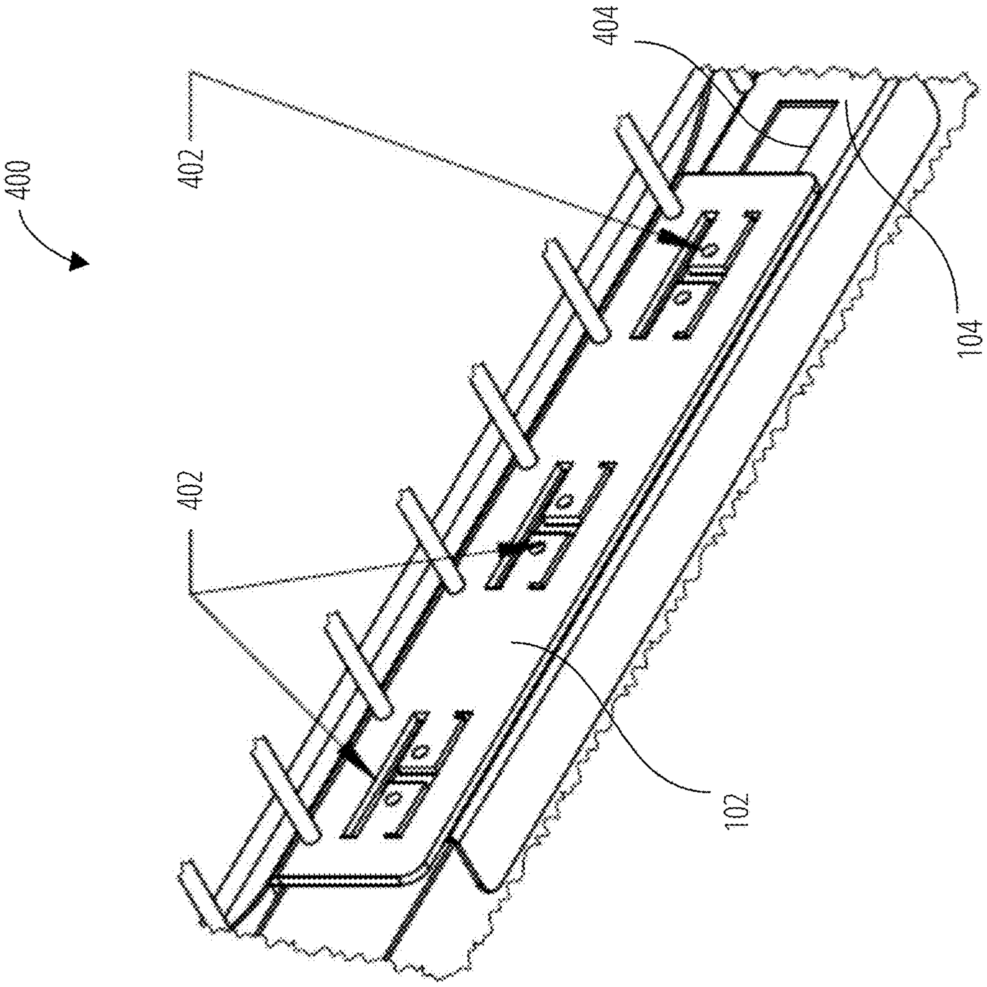
FIG. 4 illustrates a ceiling attachment for use with the cage of FIG. 1.

FIG. 4 illustrates a ceiling attachment 400 between the ceiling 102 and the sidewall 104 that can be made quickly and easily and that provides a rigid connection. The ceiling 102 includes at least one knockout 402 that is easily deflectable out of the plane of the ceiling 102 in which it is formed. At least one knockout 402 aligns with a knockout window 404 when the ceiling 102 is properly positioned. The user then deforms the knockout 402 so that it engages the knockout window 404 to fix the position of the ceiling 102 with respect to the sidewall 104. Of course, other arrangements or attachment mechanisms could be employed as desired.

Figure 5:
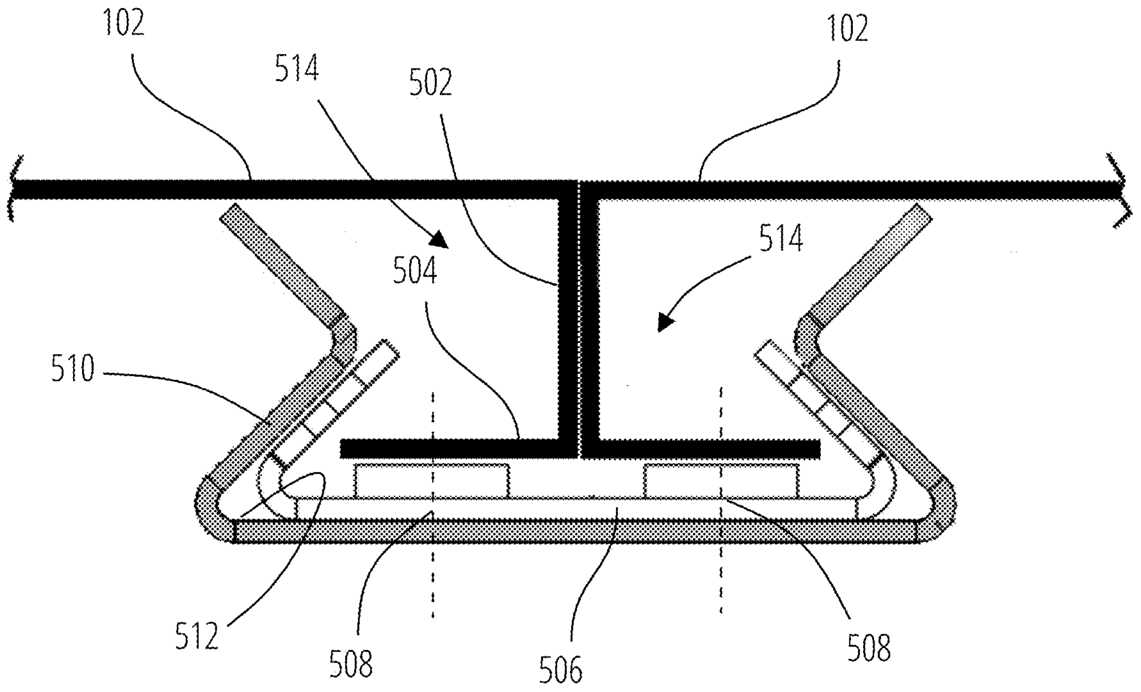
FIG. 5 is an end view illustrating the attachment of two ceilings.

While FIG. 4 illustrates the attachment of a ceiling 102 or ceiling panel to a sidewall 104, FIG. 5 illustrates the connection between adjacent ceilings 102. Each ceiling 102 includes roof connection portion 514 that includes a vertical leg 502 and a horizontal leg 504. The vertical legs 502 are positioned adjacent one another and may employ knockouts 402 and knockout windows 404 as described with regard to FIG. 4.

One or more roof locks 506 are positioned adjacent the horizontal legs 504 to further enhance the attachment of the ceilings 102. Each roof lock 506 includes a planar portion and two legs angled obliquely with respect to the planar portion such that the roof locks 506 can engage and remain engaged to the ceilings 102 without further fasteners. Once positioned, fasteners fixedly attach the roof locks 506 to the ceilings 102. Once the fasteners are in place a rigid and aligned connection between the ceilings 102 is established and maintained. In preferred constructions, the fasteners threadably engage one of the roof locks 506 and the ceiling 102. However, other types of fasteners could be employed if desired.

A roof lock cover 510 defines a pocket 512 that is sized to closely receive one or more of the roof locks 506. The cover 608 is positioned over the roof locks 506 to inhibit unauthorized access to the fasteners, thereby making it difficult to disassemble the ceilings 102 from one another.

Figure 6:
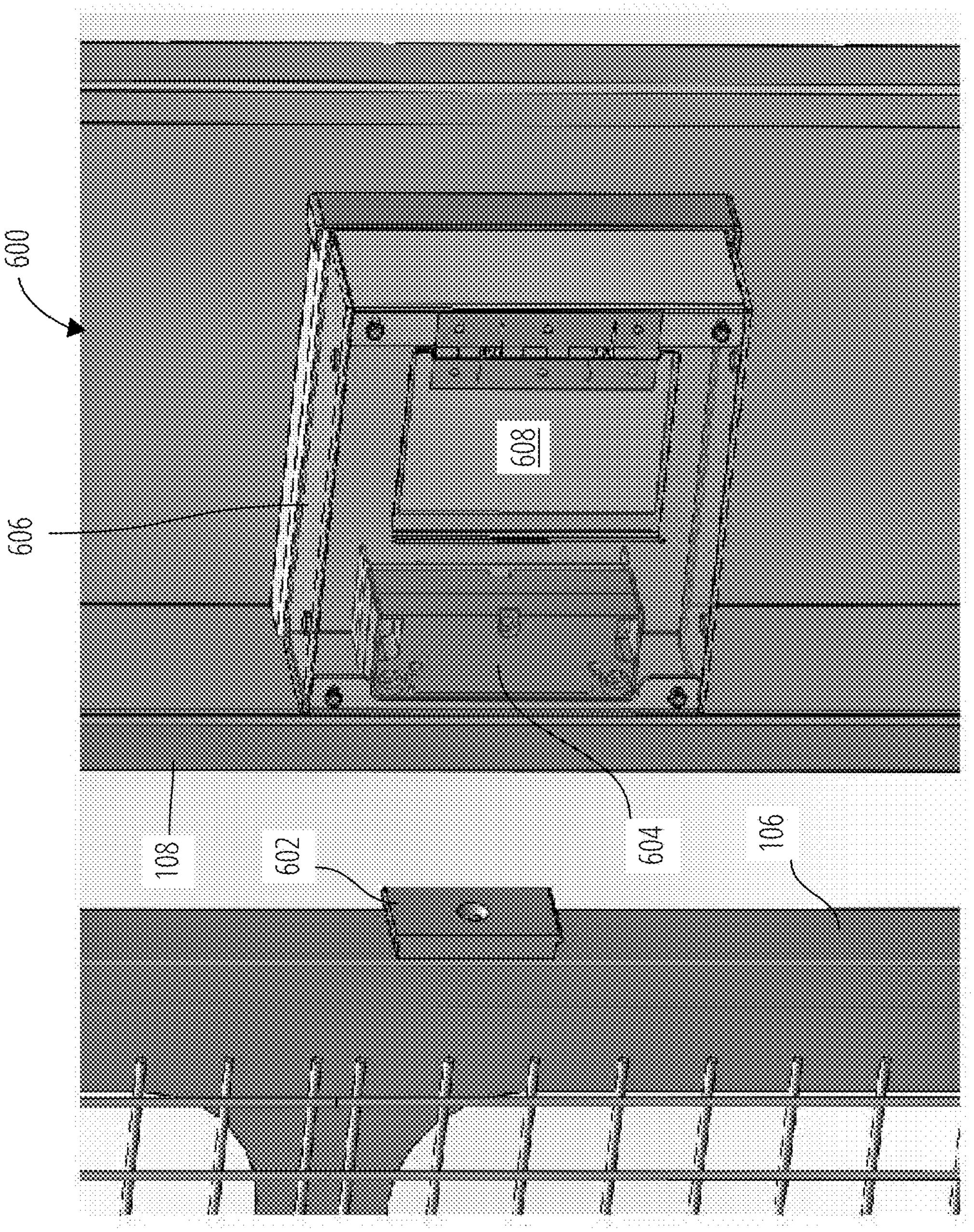
FIG. 6 illustrates a lock mechanism for use with the cage of FIG. 1.

FIG. 6 illustrates another door lock mechanism 600 that uses an electromagnet 604 rather than a latch member 202 to maintain the door 106 in the closed position. The lock mechanism 600 includes a strike plate 602 mounted to the door 106 in a position where it can be positioned in close proximity to an electromagnet 604. The strike plate 602 is formed from a ferromagnetic material to assure the electromagnet 604 provides enough engagement force to hold the door 106 in the closed position.

The electromagnet 604 is positioned within a lock box 606 which is mounted to the interior of the entry panel 108. A cover 608 allows for easy access to the interior of the lock box 606. In some constructions, the electromagnet 604 is powered by an external power source with a battery backup available to maintain the door 106 in the closed position during a power outage. Within the lock box 606, a button or other actuator is provided to cut power to the electromagnet 604. The button or actuator can be used by a person who is accidentally locked or trapped in the cage 100 to cut power to the electromagnet 604 to allow for the exit from the cage 100.

The entry control device 116 is attached to the outside of the entry panel 108 and allows the user to access the cage 100. Specifically, the entry control device 116 could include a card reader, an RFID reader, or other device that determines if the presenter is allowed access and if the presenter is approved, cuts power to the electromagnet 604 to allow opening of the door 106.

Figure 7:
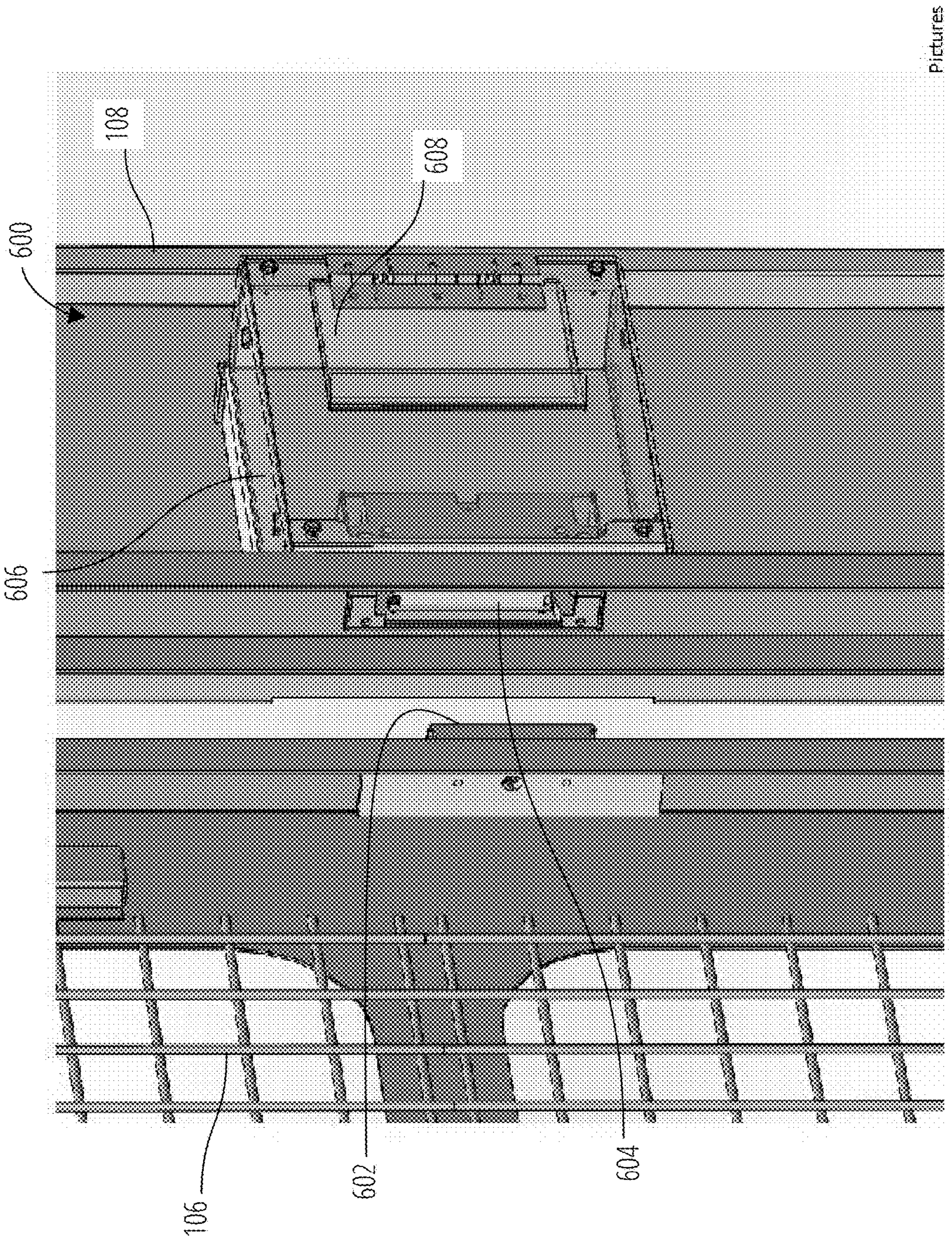
FIG. 7 illustrates the lock mechanism of FIG. 6.

FIG. 7 illustrates the lock mechanism 600 from a different angle and illustrates the cover 608 in the closed position. The cover 608 attaches to the lock box 606 with a simple hinge that allows the door to swing open and closed. In preferred arrangements, the hinge is biased toward a closed position to assure that the cover remains closed during normal use.

To assemble the cage 100 the user first connects a first sidewall 104 to a second sidewall 104 by engaging the corner bracket of the first sidewall 104 with the second corner bracket of the second sidewall 104. An additional sidewall 104, a door 106, and an entry panel 108 are then connected in a similar manner. The ceiling 102 and floor 112 if employed are then attached as described with regard to FIG. 4.

In use, the user presents a credential, enters a code in a keypad, or performs whatever act is required at the entry control device 116 to verify authorized entry. Once authorized, the latch mechanism 200 of FIG. 2 retracts the movable member from the vicinity of the pawl 204 such that the user can rotate the latch member 202 using a lever on the outside of the door 106 to open the door 106. In constructions that employ the lock mechanism 600 of FIG. 6 and FIG. 7, the approved authorization cuts power to the electromagnet 604 to allow the door 106 to open.

Figure 8:
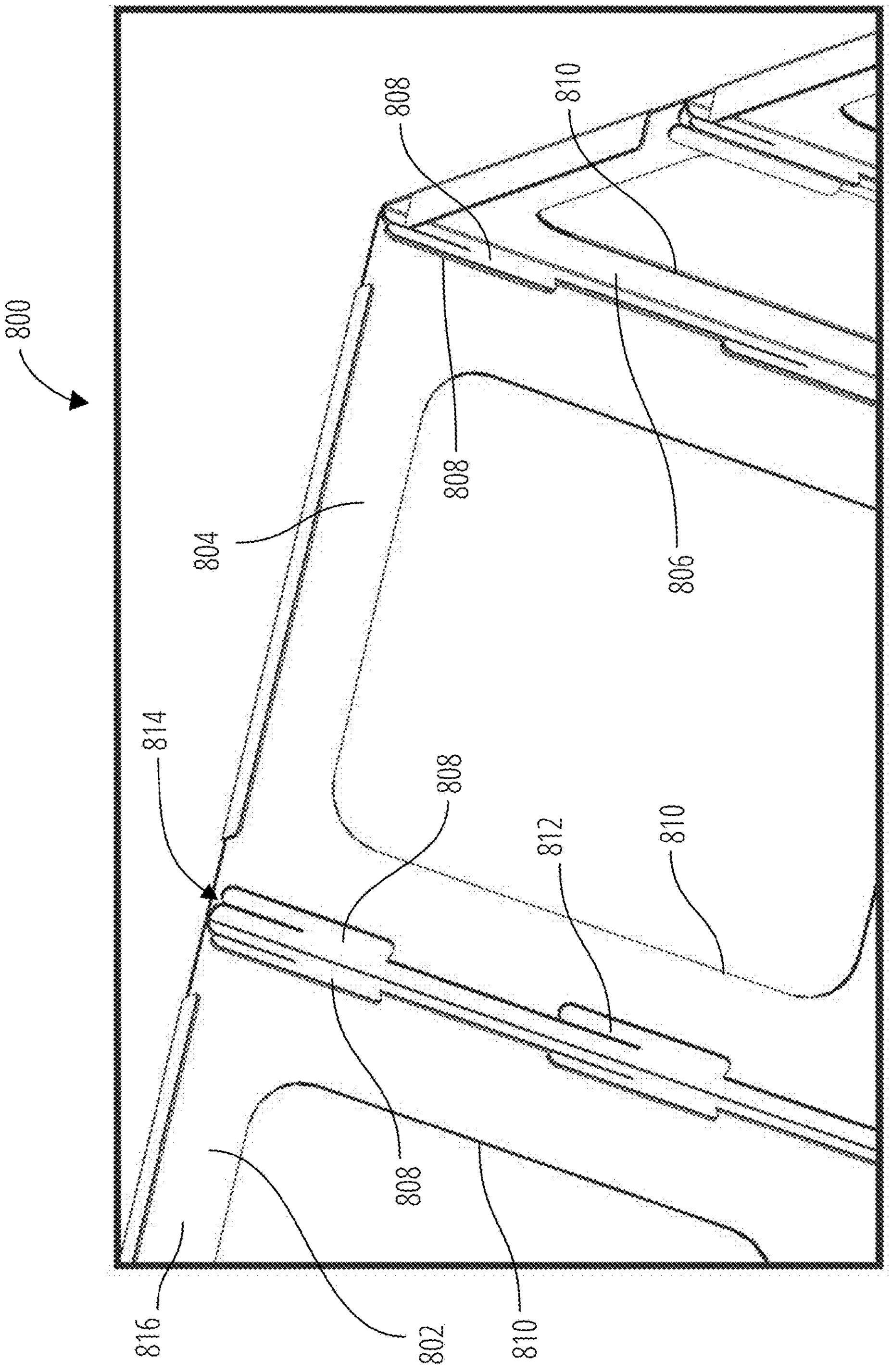
FIG. 8 illustrates a security cage 800 in accordance with one embodiment.

FIG. 8 illustrates a portion of another construction of a security cage 800. FIG. 8 illustrates three identical or substantially similar side panels 802 that each include a panel body 816 that defines a height, a depth (thickness of the panel), and a width. Each side panel 802 may include one or more panel openings 810 arranged as desired for the particular security cage 800. The panel openings 810 can be covered with a number of desired materials including a wire mesh, a screen, a glass or plastic panel, and the like. Each side panel 802 includes one or more locking tabs 808 positioned along the length of each of the edges that define the height (i.e., the vertical edges when the security cage 800 is assembled). Each locking tab 808 extends inward (i.e., into the interior of the security cage 800) and includes a slot 812 that defines an open end 814 that faces upward when in the assembled position.

A second side panel 802 in the form of a first corner panel 804 is positioned adjacent the side panel 802 in the same or nearly the same plane as the side panel 802 to define or at least partially define a side wall of the security cage 800. The first corner panel 804 is substantially the same as the side panel 802 and as such includes several locking tabs 808 that extend along both vertical edges of the first corner panel 804. The locking tabs 808 of the first corner panel 804 are arranged the same as the locking tabs 808 of the side panel 802.

A third side panel 802 in the form of a second corner panel 806 is positioned adjacent the first corner panel 804 in a plane that is substantially normal to the plane of the first corner panel 804 to define a corner of the security cage 800. The second corner panel 806 is substantially the same as the side panel 802 and as such includes several locking tabs 808 that extend along both vertical edges of the second corner panel 806. The locking tabs 808 of the second corner panel 806 are arranged the same as the locking tabs 808 of the side panel 802.

The term "identical" when used with respect to side panels herein means that the side panels have similar height and depth dimensions (within engineering tolerances) and include the same attachment arrangement as will be discussed. Identical or substantially similar side panels 802 can be significantly different in width and include other differences not related to the assembly of the panels.

Figure 9:
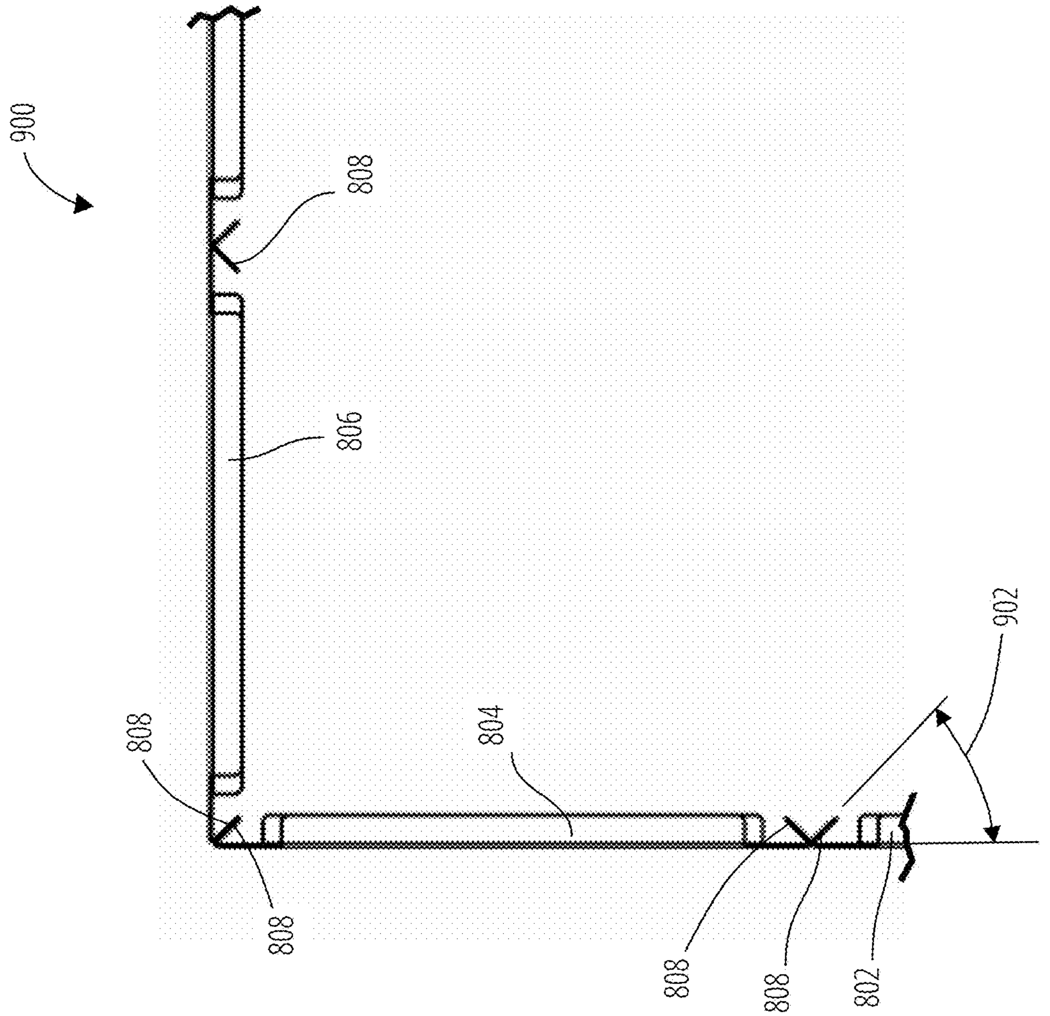
FIG. 9 illustrates an item 900 in accordance with one embodiment.

FIG. 9 better illustrates the arrangement of the components described in FIG. 8. With reference to FIG. 9, it can be seen that the side panel 802 and the first corner panel 804 are arranged in a common plane to partially define a wall. The locking tabs 808 that extend along the vertical edges of the side panel 802 and the first corner panel 804 are arranged at a tab angle 902 with respect to their respective panels. In the illustrated construction, the tab angle 902 is forty-five degrees (plus or minus five degrees). Of course, other constructions may use different angles.

In the construction of FIG. 9, the locking tabs 808 of adjacent vertical edges are positioned near one another, and preferably in contact with one another. In this position, the locking tabs 808 define a ninety-degree angle therebetween.

FIG. 9 also illustrates the interface between the first corner panel 804 and the second corner panel 806. Again, the vertical edges of each panel include locking tabs 808 arranged at the tab angle 902. the abutting edges in the corner include several locking tabs 808 that are positioned adjacent one another or in contact with one another. When the side panels 802 are arranged in a planar member (i.e., a wall). The locking tabs 808 cooperate to define a ninety-degree angle therebetween. However, when the side panels 802 are arranged normal to one another (i.e., a corner), the angle between the locking tabs 808 is about zero degrees and the locking tabs are parallel or nearly parallel to one another.

Figure 10:
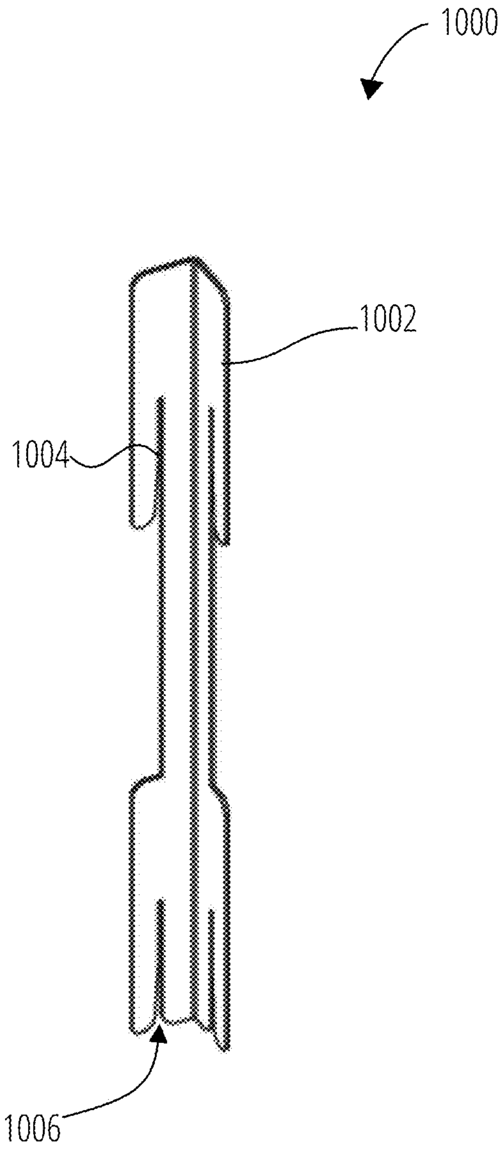
FIG. 10 illustrates a side locking member 1000 in accordance with one embodiment.

FIG. 10 illustrates a side locking member 1000 that is used to connect a pair of side panels 802 arranged adjacent one another in a common plane (i.e., a wall). The side locking member 1000 includes a pair of upper opposed locking ears 1002 and a pair of lower opposed locking ears 1002. The opposed locking ears 1002 are arranged to define a ninety-degree angle therebetween (plus or minus 10 degrees).

Each of the locking ears 1002 defines a locking slot 1004 that defines a locking slot opening 1006. The locking slot openings 1006 are arranged to open in a downward direction (when assembled) opposite to the slots 812 formed in the locking tabs 808.

While a single side locking member 1000 is illustrated in FIG. 10, it should be understood that two or more side locking members 1000 are preferably used to connect any two adjacent side panels 802. Of course, a single side locking member 1000 could be employed if desired.

Figure 11:
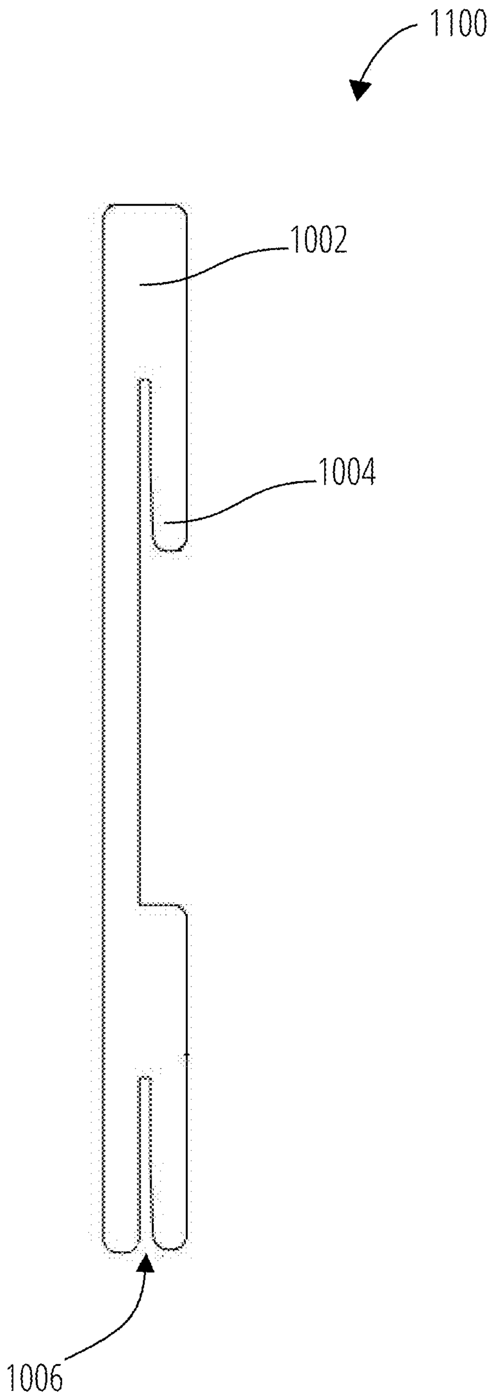
FIG. 11 illustrates a corner locking member 1100 in accordance with one embodiment.

FIG. 11 illustrates a corner locking member 1100 that is used to connect a pair of side panels 802 arranged adjacent to and normal to one another (i.e., a corner). The corner locking member 1100 includes an upper locking ear 1002 and a lower locking ear 1002. The corner locking member 1100 is a substantially flat or planar member.

Each of the locking ears 1002 defines a locking slot 1004 that defines a locking slot opening 1006. The locking slot openings 1006 are arranged to open in a downward direction (when assembled) opposite to the slots 812 formed in the locking tabs 808.

While a single corner locking member 1100 is illustrated in FIG. 11, it should be understood that two or more corner locking members 1100 are preferably used to connect any two adjacent side panels 802. Of course, a single corner locking member 1100 could be employed if desired.

Figure 12:
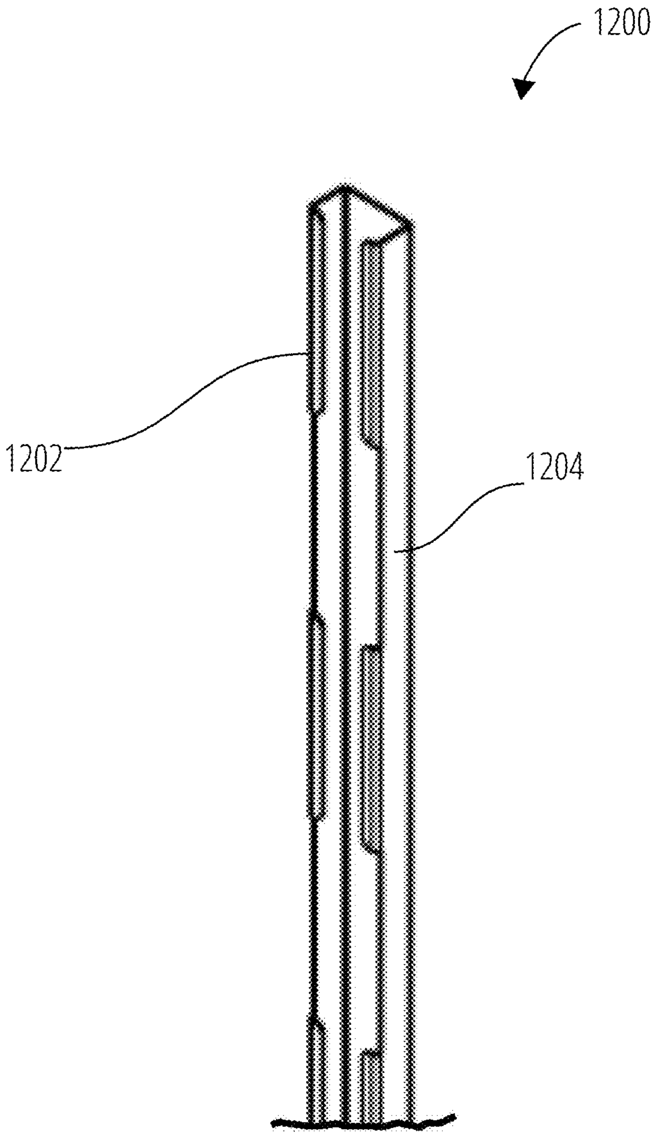
FIG. 12 illustrates a side cover 1200 in accordance with one embodiment.

FIG. 12 illustrates a portion of a side cover 1200 that is used to cover the locking tabs 808 and the side locking members 1000 at each wall intersection of adjacent side panels 802. In preferred constructions, a single side cover 1200 covers the entire length of the joint between side panels 802. However, multiple side covers 1200 could be employed if desired.

Each side cover 1200 includes a body portion 1204 that includes three sides that define an open interior. Several engagement tabs 1202 extend from two of the sides toward one another to partially define a fourth surface. In this arrangement, the engagement tabs 1202 are substantially parallel to one another and are substantially co-planar (i.e., within engineering tolerances). The engagement tabs 1202 are spaced apart from one another a distance that is about equal to the spacing between locking tabs 808 on the side panels 802.

Figure 13:
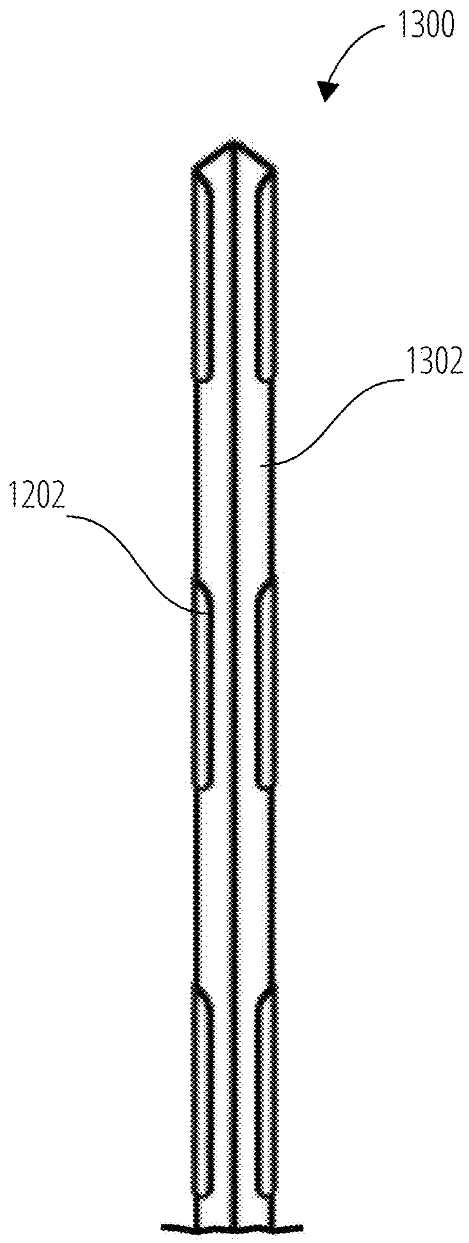
FIG. 13 illustrates a corner cover 1300 in accordance with one embodiment.

FIG. 13 illustrates a portion of a corner cover 1300 that is used to cover the locking tabs 808 and the corner locking members 1100 at each corner intersection of adjacent side panels 802 (i.e., first corner panel 804 and second corner panel 806). In preferred constructions, a single corner cover 1300 covers the entire length of the joint between the corner-defining side panels 802. However, multiple corner covers 1300 could be employed if desired.

Each corner cover 1300 includes a body portion 1302 that includes two sides arranged at about ninety degrees with respect to one another. Several engagement tabs 1202 extend from the two sides at about ninety degrees to one another to partially define two additional sides that cooperate with the two sides to define a square or rectangular inner space. In this arrangement, the engagement tabs 1202 are substantially normal to one another a (i.e., within engineering tolerances). The engagement tabs 1202 are spaced apart from one another a distance that is about equal to the spacing between locking tabs 808 on the side panels 802 (first corner panel 804 and the second corner panel 806).

Figure 14:
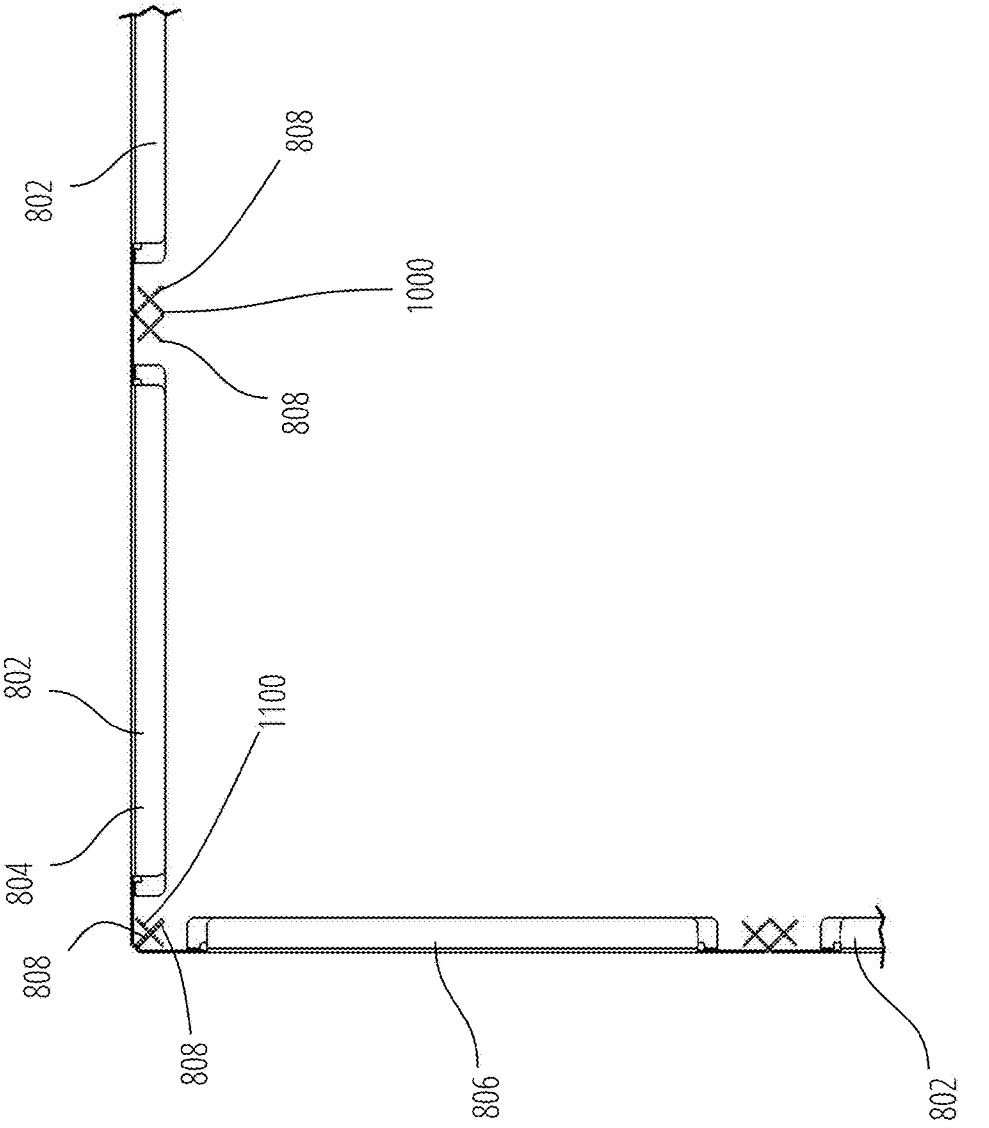
FIG. 14 is a top view of a portion of the security cage of FIGS. 8-13 with side locking members and corner locking members in place.

FIG. 14 illustrates a portion of the security cage 800 during the assembly process. To assemble the security cage 800, the user first positions two side panels 802 adjacent one another. The side panels 802 can be two parallel side panels 802 that partially or fully define a wall or can be two side panels 802 arranged normal to one another to define a corner. Preferably, the first corner panel 804 and the second corner panel 806 are positioned first as once assembled, they can stand in their desired orientation without additional support.

Once the first corner panel 804 and the second corner panel 806 are arranged as desired, the corner locking members 1100 are positioned. Each corner locking member 1100 is positioned above the locking tabs 808 to be locked and then slid downward such that the locking ears 1002 and more specifically, the locking slots 1004 engage the locking tabs 808 and more specifically, the slots 812 of the first corner panel 804 and the second corner panel 806 to attach the first corner panel 804 and the second corner panel 806 to one another and define a corner.

FIG. 14 also illustrates the attachment of the side panel 802 to the first corner panel 804 to at least partially define the wall. As discussed, when the 802 is positioned adjacent the first corner panel 804, the respective locking tabs 808 define a ninety-degree angle therebetween. Side locking members 1000 are positioned such that the locking ears 1002 and more specifically, the locking slots 1004 are positioned to engage the locking tabs 808 and more specifically, the slots 812 of the side panel 802 and the first corner panel 804 to attach the side panel 802 and the first corner panel 804 to one another in a planar arrangement.

Each of the side locking members 1000 and the corner locking members 1100 are held in the engaged position by gravity due to the arrangement of the various slots.

Figure 15:
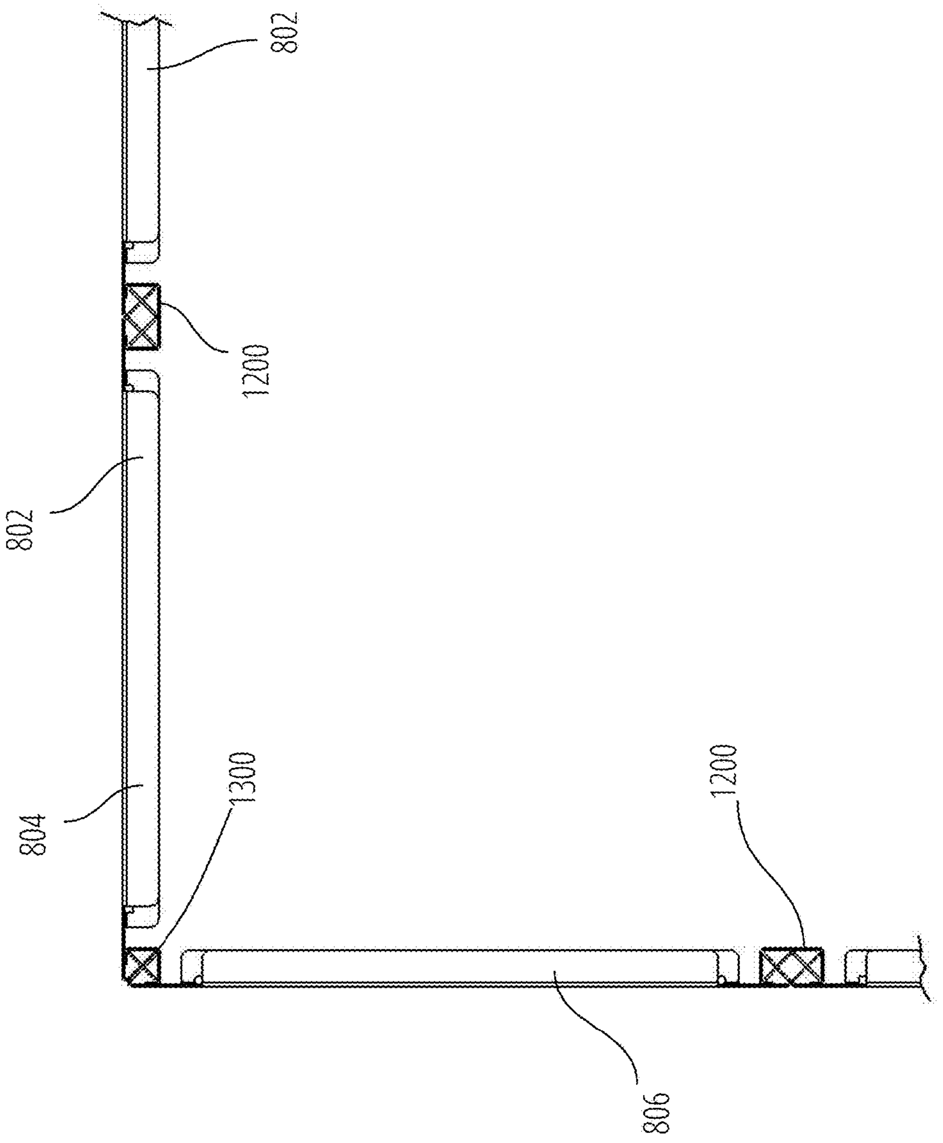
FIG. 15 is a top view of the portion of the security cage of FIG. 14 with side covers and a corner cover in place.

FIG. 15 illustrates the final assembly step in which any required side covers 1200 and corner covers 1300 are installed. Each side cover 1200 is positioned adjacent to and above the locking tabs 808 and side locking members 1000 it is intended to cover. From this position, the side cover 1200 is lowered such that the engagement tabs 1202 of the side cover 1200 engage the locking ears 1002 of the side locking members 1000. Once in place, each side cover 1200 is held in place by gravity.

The corner covers 1300 are installed in a similar manner. Each corner cover 1300 is positioned adjacent to and above the locking tabs 808 and corner locking members 1100 it is intended to cover. From this position, the corner cover 1300 is lowered such that the engagement tabs 1202 of the corner cover 1300 engage the locking ears 1002 of the corner locking members 1100. Once in place, each corner cover 1300 is held in place by gravity.

The side covers 1200 and corner covers 1300 serve to provide a more appealing look to the security cage 800 but also make unwanted disassembly difficult. With the security cage 800 mounted to the floor 112 and the roof panels in place, one cannot lift the side covers 1200 or the corner covers 1300 high enough to disengage from the side locking members 1000 and the corner locking members 1100. As such, the side locking members 1000 and the corner locking members 1100 cannot be accessed and removed.

Figure 16:
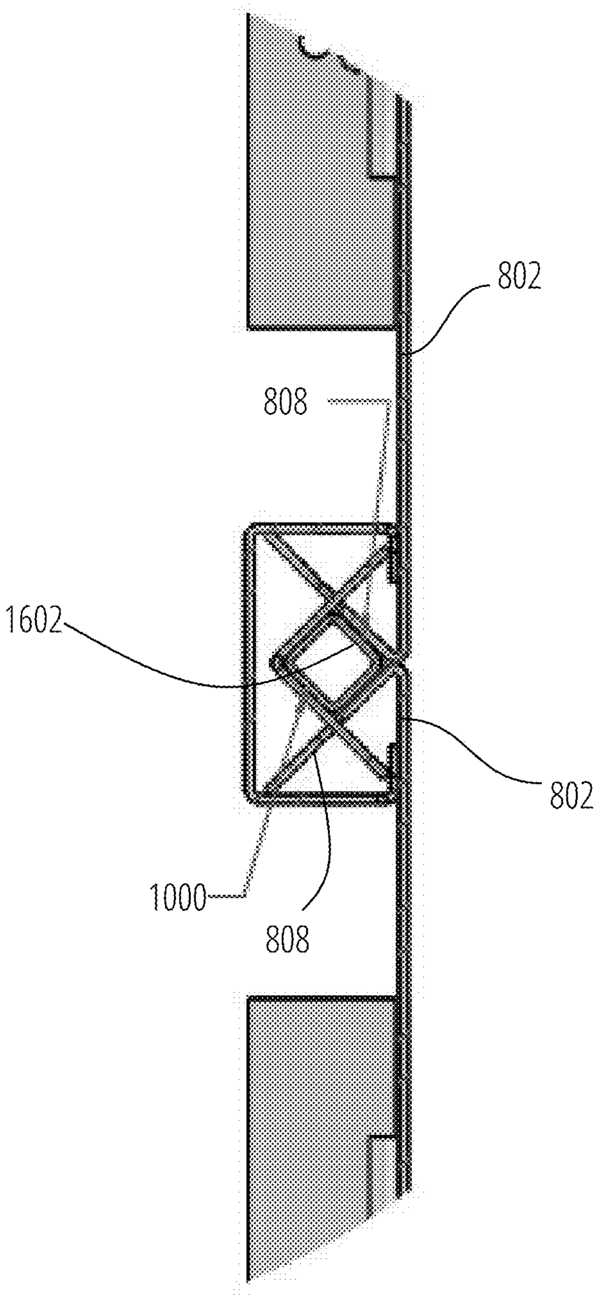
FIG. 16 is a top view of another arrangement of the portion of the security cage of FIG. 14 with side covers and a corner cover in place.

FIG. 16 illustrates the use of a beam member 1602 to better align connected side panels 802 and to better maintain that alignment. As described above, the side panels 802 are positioned adjacent one another to allow for their connection via one or more side locking members 1000. As illustrated in FIG. 16, the beam member 1602 is a rectangular cross-section hollow beam that fits within a space formed between the side locking member 1000 and the locking tabs 808 of the adjacent side panels 802. In preferred constructions, the beam member 1602 is attached (i.e., welded, brazed, glued, fastened, etc.) to the side locking member 1000 before the side locking member 1000 is installed. the beam member 1602 reduces the likelihood of relative movement or twisting between the various components, thereby assuring a better and more predictable alignment during assembly.

While a rectangular hollow beam member 1602 is illustrated in FIG. 16, other shapes or arrangements could be employed if desired.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A security cage comprising:

a first side panel defining a first panel plane and having a first vertical edge that extends from the first panel plane at an oblique angle and defines a height;

a first locking tab extending from the first vertical edge and defining a first upward facing hook;

a second side panel defining a second panel plane and having a second vertical edge that extends from the second panel plane at the oblique angle;

a second locking tab extending from the second vertical edge and defining a second upward facing hook, the second side panel positioned adjacent to and parallel to the first side panel such that the first locking tab is positioned adjacent the second locking tab; and a side locking member having a first locking ear that defines a first downward facing hook and a second locking ear that defines a second downward facing hook, the first locking ear and the second locking ear being non-parallel, the first downward facing hook engaging the first upward facing hook and the second downward facing hook engaging the second upward facing hook to fix the second side panel with respect to the first side panel to define a planar wall.

2. The security cage of claim 1, wherein the side locking member includes a first leg and a second leg that cooperate to define an angle such that the side locking member defines a closed side and an open side.

3. The security cage of claim 2, further comprising a beam member having a rectangular cross-section sized to fit within the closed side of the side locking member.

4. The security cage of claim 1, wherein the first locking tab and the second locking tab cooperate to define a tab angle therebetween, and wherein the tab angle is between 60 degrees and 120 degrees.

5. The security cage of claim 4, wherein the tab angle is 90 degrees.

6. The security cage of claim 1, further comprising a roof panel positioned adjacent the first side panel, and wherein one of the first side panel and the roof panel includes an attachment aperture and the other of the first side panel and the roof panel includes a knockout member bendable between a first position in which the first side panel and the roof panel are not connected and a second position in which a portion of the knockout member extends through the attachment aperture to connect the first side panel and the roof panel.

7. A security cage defining a cage interior and a cage exterior, the security cage comprising:

a first side panel;

a second side panel;

a first roof panel connected to the first side panel, the first roof panel having a cage interior side, a cage exterior side, and a first edge that defines a first roof connection portion and extends toward the cage interior side;

a second roof panel, separate and distinct from the first roof panel, the second roof panel connected to the second side panel, the second roof panel having a cage interior side, a cage exterior side, and a second edge that defines a second roof connection portion and extends toward the cage interior side, the second roof connection portion positioned parallel to the first roof connection portion;

a roof lock disposed completely within the cage interior and connected to each of the first roof connection portion and the second roof connection portion to connect the first roof panel to the second roof panel; and a roof lock cover coupled to the roof lock to cover the roof lock.

8. The security cage of claim 7, wherein the side locking member includes a first leg and a second leg that cooperate to define an angle such that the side locking member defines a closed side and an open side.

9. The security cage of claim 8, further comprising a beam member having a rectangular cross-section sized to fit within the closed side of the side locking member.

10. The security cage of claim 7, wherein the first side panel defines a planar side portion, and wherein the first side panel includes a first locking tab that cooperates with the planar side portion to define an oblique angle therebetween.

11. The security cage of claim 10, wherein the second side panel includes a second locking tab, and wherein first locking tab and the second locking tab cooperate to define a tab angle therebetween, and wherein the tab angle is between 60 degrees and 120 degrees.

12. The security cage of claim 11, wherein the tab angle is 90 degrees.

13. The security cage of claim 7, wherein one of the first side panel and the first roof panel includes an attachment aperture and the other of the first side panel and the first roof panel includes a knockout member bendable between a first position in which the first side panel and the first roof panel are not connected and a second position in which a portion of the knockout member extends through the attachment aperture to connect the first side panel and the first roof panel.

14. The security cage of claim 7, wherein the roof lock includes a first fastener that threadably connects the roof lock to the first roof panel, a second fastener that threadably connects the roof lock to the second roof panel, and a third fastener that threadably connects the roof lock cover to the roof lock.

15. A security cage comprising:

a first side panel having a planar portion, a first edge arranged at a first oblique angle with respect to the planar portion and a second edge arranged at second oblique angle with respect to the planar portion;

a second side panel having a planar portion, a third edge arranged at a third oblique angle with respect to the planar portion and a fourth edge arranged at a fourth oblique angle with respect to the planar portion, the second side panel positioned adjacent the first side panel such that the first edge and the third edge cooperate to define a 90 degree angle therebetween;

a third side panel having a planar portion, a fifth edge arranged at a fifth oblique angle with respect to the planar portion and a sixth edge arranged at a sixth oblique angle with respect to the planar portion, the third side panel positioned adjacent the second side panel such that the fifth edge and the fourth edge are parallel to one another;

a first roof panel connected to the first side panel, the first roof panel having a first edge that defines a first roof connection portion;

a second roof panel connected to the second side panel, the second roof panel having a second edge that defines a second roof connection portion, the second roof connection portion positioned adjacent the first roof connection portion; and a roof lock connected to each of the first roof connection portion and the second roof connection portion.

16. The security cage of claim 15, further comprising a first upward facing hook formed as part of the first edge, a second upward facing hook formed as part of the third edge, and a side locking member having a first downward facing hook and a second downward facing hook, the first downward facing hook engaging the first upward facing hook and the second downward facing hook engaging the second upward facing hook to fix the second side panel with respect to the first side panel.

17. The security cage of claim 16, wherein the side locking member includes a first leg and a second leg that cooperate to define a 90-degree angle such that the side locking member defines a closed side and an open side.

18. The security cage of claim 17, further comprising a beam member having a rectangular cross-section sized to fit within the closed side of the side locking member.

19. The security cage of claim 15, further comprising a roof lock cover coupled to the roof lock to cover the roof lock.

* * * * *